Dec. 8, 1964     G. B. FOSTER     3,160,745
RADIATION GAUGING SYSTEM FOR MEASURING THE PROGRESS
OF SETTLING IN SLURRIES AND SUSPENSIONS
Filed May 19, 1961

INVENTOR
George B. Foster
ATTORNEY

United States Patent Office 3,160,745
Patented Dec. 8, 1964

3,160,745
RADIATION GAUGING SYSTEM FOR MEASURING THE PROGRESS OF SETTLING IN SLURRIES AND SUSPENSIONS
George B. Foster, Worthington, Ohio, assignor to Industrial Nucleonics Corporation, a corporation of Ohio
Filed May 19, 1961, Ser. No. 111,273
3 Claims. (Cl. 250—43.5)

This invention relates generally to nuclear instrumentation for the measurement of the density of a fluid stream and specifically to the method and means for the detection and determination of the mass divergence in slurries, suspensions, colloidal dispersions, and aerosols.

In the transmission of solids from one point to another it is often convenient to use liquid suspensions in the form of slurries and colloids. Slurries are also used to afford intimate intermixture of solids and liquids. Such intermixture is required for a variety of reasons. In nuclear reactors the liquid may be serving the function of a heat transfer medium and simultaneously serving as a neutron moderator. Gas streams are also employed as a transport means for finely divided particles of solid matter as in the case of coal dust blown by air into the combustion chamber of power plant boilers. Liquid droplets are also transported in this manner.

In all such systems it is a more or less important matter that the consistency of the distribution of the particles be uniform throughout the medium. In the case of the transportation of finely divided coal in a water vehicle for long distances by pipeline it is of great economic importance that a "fall out" of the coal particles not occur within the pipe. Not only does this effect, which results in a pile of the material along the lower surface of the pipe, cause a greatly reduced efficiency of transmission of coal through the pipeline, but it also requires specific remedies to reverse the situation and flush the material out so normal operation can be restored. Also the propagation of the flame front in the combustion of finely divided combustibles is altered by variations in the distribution of the particles in the gaseous vehicle.

The present invention is a method and means of detecting the uniformity of the dispersions and slurries discussed above. In the preferred embodiment a radiation source and detector are utilized to observe the relative radiation absorption or scattering at the upper portion of the pipe and a similar radiation source and detector are also utilized to observe the lower portion. The outputs of these two detection devices are compared and the uniformity of the particle density in the medium is then obtained.

It is, accordingly, a primary object of the present invention to provide a new and improved nuclear measuring instrument.

It is a further object of the present invention to provide a method and means for determining the uniformity of the dispersions and slurries in a liquid suspension.

It is another object of the present invention to provide such a means that is adaptable to present day continuous liquid stream processes with only a minimum of modification thereto.

Other objects and features will become apparent from the following detailed description taken in conjunction with the drawings in which FIG. 1 is a cut-away portion of an enclosing boundary or pipe for a liquid slurry having a uniform distribution of particles.

Figure 1:
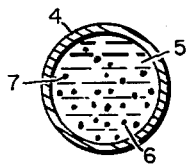
Figure 2:
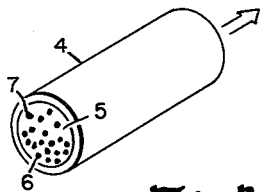
FIG. 2 is a cut-away portion of an enclosing boundary or pipe for a liquid slurry having non-uniform distribution of particles.

Referring now to the drawings, consider a pipe or other enclosing boundary 4 for a liquid slurry 5 shown in FIG. 1. The particles, 6 and 7, shown in the cross-section view are uniformly distributed. If the slurry becomes non-uniform in its distribution of particles, and if the system is subjected to an external force field such as gravity or a centrifugal acceleration, then the particles 6 and 7 will tend to concentrate in one region of the pipe more than another. The direction of movement will be a function of the direction of the force field and of the relative specific gravities of the particles and the vehicle. In a typical case the force will be gravitational only and the illustration is continued on that basis. FIG. 2 shows the consequence of an inadequate slurry dispersion in a vehicle 5 and the resulting concentration of the solids 6 in the lower region of the containing volume 4.

Figure 3:
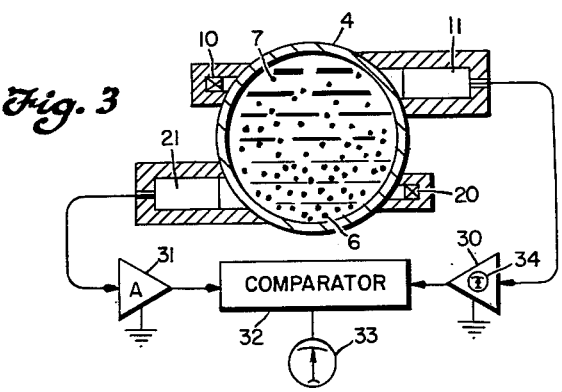
FIG. 3 is an embodiment of the present invention operative to determine the uniformity of the distribution of particles in a liquid slurry.

In accordance with the general concepts of the present invention there is illustrated in FIG. 3 the means for determining the particle distribution in a pipe. A first source of radiation, which can be any one of those available for nuclear instrumentation, is mounted on the upper limits of the pipe 4. Directly opposite the source 10 there is mounted on the pipe 4 a detector 11. This detector can be an ionization chamber or other suitable means dependent upon the particle nuclear instrumentation desired. Similarly a second source 20 and a corresponding detector 21 are oppositely mounted and the edge of the pipe 4 opposite to the edge of the first source 10 and detector 11. In this particular instance source 10 and detector 11 are mounted on the top of the pipe 4 and source 20 and detector 21 are mounted at the bottom of the pipe 4.

The outputs of the detectors 11 and 21 are respectively fed to amplifiers 30 and 31 wherein their outputs are amplified in a conventional manner. The outputs of the amplifiers 30 and 31 are then fed to a comparison circuit 32 for a determination of difference of the two signals if any. The resulting signal is then applied to an indicating device 33 calibrated in convenient units.

In this case this comparison is shown to be made after separate amplifiers. This comparison could be made directly at the output of the detectors themselves and comparison effected by the algebraic addition to two output currents of opposite polarities. In the embodiment shown, the individual amplifiers are used because of the convenience provided in adjusting for balance, i.e., equal outputs from the two channels when an absorbing medium of uniform mass cross-section for the whole volume is under examination.

In the apparatus of FIG. 3, only one "balance" control 34 is shown and this serves to bring the outputs of the two channels to equal values. Electrically the balance control 34 could adjust the current gain of a feedback electrometer amplifier or the voltage gain if that were called for by the comparator circuit used.

The indicator 33 is marked in values of 1 to 10. Of course higher values are possible, particularly in the case of dust fallout from a gaseous medium. However, the value cannot be below 1.0 since this indicates uniform mass cross section for both the upper first channel and the lower second channel. However, in certain cases a meaning could be assigned to a negative value. If in the apparatus illustrating the case of FIG. 2, positive values indicated a greater mass cross section in the lower portion of the pipe than in the top, then a negative value would indicate the opposite condition, i.e., a greater mass cross section in the top of the pipe. However, the numeric value would not be less than unity.

In the apparatus discussed above, an operable system absorption curves of the two channels, it is necessary to stream conditions is outlined. In a commercial embodiment it is more likely that a fully calibrated gauging means would be used in each channel. This would make the apparatus more readily applicable to a wide variety of monitoring assignments, would make the comparator adjustments simpler, and would make use of techniques of measurement which have already achieved a high degree of development.

Figure 4:
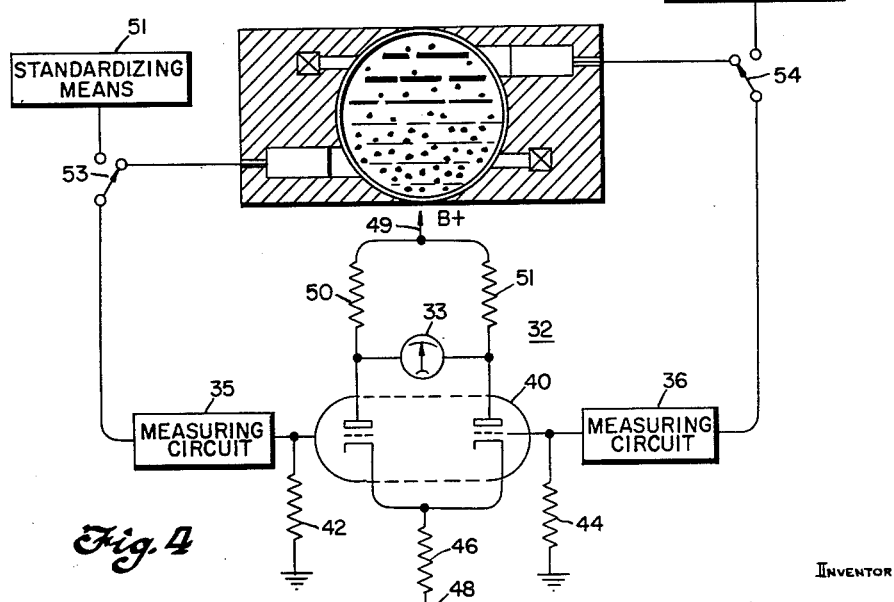
FIG. 4 is a typical embodiment illustrated with more detail than FIG. 3.

In FIG. 4 there is shown a form of such apparatus. The outputs of the first and second channels are linearized in the measuring circuits 35 and 36 so as to provide a straight-line function of the variation in absorption caused by variation in absorption in the slurry or particle suspension concentration in the medium. The output voltage for each channel is the same for equal indicated slurry concentrations. These voltages are then compared in the strapped cathode comparator and deviations are shown on the meter connected plate-to-plate. In the example shown both positive and negative values of mass uniformity divergence are accommodated.

It is, of course, possible that many slurries would be operated at mass uniformity divergence values greater than 1.0. The mass uniformity divergence detector described herein is equally useful for such situations. Limits of desirable ranges of values can be set into limit detection apparatus and flow velocity, and solids injection rate or agitation means can be varied to assure continued operation within this established rnge. Because of the lack of absolute parallelism between the two radiation absorption curves of the two channels, it is necessary to adjust for balance at the actual mass cross-section value to be monitored. This can be accomplished by use of standardization means 51 and 52 placed in the circuit by switches 53 and 54, respectively. These balance settings as a function of process mass cross section are then obtained by routine calibration, with samples of known characteristics.

The outputs of the measuring circuits 35 and 36 are coupled into a cathode-coupled dual triode 40 having grid resistances 42 and 44. Cathode resistor 46 is connected to ground potential 48. A source of operating potential is provided on line 49 through plate resistances 50, 51.

Although a specific embodiment of the present invention is shown and described, it should be apparent to those skilled in the art that numerous modifications, additions and substitutions may be made without detracting from the spirit and scope of the present invention.

I claim:

1. In a system for conveying a fluid containing suspended particles from one point to another, said fluid being subjected to a unidirectional accelerating force, apparatus for measuring the progress of the settling of said particles under the influence of said force, said apparatus comprising means for conveying said fluid without agitation thereof through a testing region so as to avoid any remixing or other alteration of the results of said settling process, means for passing first and second beams of penetrative radiation through said fluid in said region, each of said radiation beams being defined by a source of said radiation and a detector receiving radiation from said source which has penetrated said fluid in a respective one of said beams, said beams being displaced from each other in the direction of said accelerating force, said radiation passing and detector means being arranged with respect to said conveying means so as to maintain a constant volume of said fluid in each of said beams, means for generating first and second signals respectively indicative of the intensity of radiation received by said detectors defining said first and second radiation beams, and means responsive to both of said signals for manifesting the progress of said settling.

2. In a system for conveying a fluid containing suspended particles from one point to another, apparatus for measuring the progress of the settling of said particles under the influence of gravity, said apparatus comprising means for conveying said fluid horizontally and without agitation thereof through a testing region so as to avoid any remixing or other alteration of the results of said settling process, means for passing penetrative radiation laterally through said fluid in said region, first and second radiation detectors mounted one above the other and each receiving a beam of said radiation which has passed through said fluid, said radiation passing and detecting means being arranged with respect to said conveying means so as to maintain a constant volume of said fluid in each of said radiation beams, means for generating first and second signals indicative of said radiation received by said first and second detectors respectively, and means for combining said signals so as to provide an indication of the progress of said settling of said particles.

3. In a system for conveying a fluid containing suspended particles from one point to another, apparatus for measuring the progress of the settling of said particles under the influence of gravity, said apparatus comprising means for conveying said fluid horizontally and without agitation thereof through a testing region so as to avoid any remixing or other alteration of the results of said settling process, means for passing penetrative radiation laterally through said fluid in said region, first and second radiation detectors mounted one above the other and each receiving a beam of said radiation which has passed through said fluid, said radiation passing and detecting means being arranged with respect to said conveying means so as to maintain a constant volume of said fluid in each of said radiation beams, means for generating first and second signals indicative of said radiation received by said first and second detectors respectively, and means for manifesting the difference between said signals so as to provide an indication of the progress of said settling of said particles.

References Cited in the file of this patent

UNITED STATES PATENTS

| | | |
|---|---|---|
| 2,722,609 | Morgan | Nov. 1, 1955 |
| 2,920,207 | Powell | Jan. 5, 1960 |
| 2,953,681 | Frazier | Sept. 20, 1960 |
| 2,953,682 | Frank | Sept. 20, 1960 |